United States Patent

Huber et al.

[11] Patent Number: 5,149,055
[45] Date of Patent: Sep. 22, 1992

[54] SHUT-OFF VALVE

[75] Inventors: Richard Huber, Modling, Austria; Peter Wirz, Unterkulm, Switzerland

[73] Assignee: Klinger AG, Zug, Switzerland

[21] Appl. No.: 549,359

[22] Filed: Jul. 6, 1990

Related U.S. Application Data

[63] Continuation-in-part of Ser. No. 363,353, Jun. 6, 1989, abandoned, which is a continuation of Ser. No. 165,407, Feb. 26, 1988, abandoned, which is a continuation of Ser. No. 935,272, Nov. 26, 1986, abandoned.

[30] Foreign Application Priority Data

Dec. 3, 1985 [DE] Fed. Rep. of Germany ....... 3542636
Jul. 8, 1986 [DE] Fed. Rep. of Germany ....... 3622889
Sep. 16, 1986 [DE] Fed. Rep. of Germany ....... 3631447

[51] Int. Cl.$^5$ .................................. F16K 3/24
[52] U.S. Cl. .................... 251/324; 251/359; 277/DIG. 6
[58] Field of Search ............. 251/359, 360, 362, 307, 251/171, 188, 190, 324; 277/235 R, DIG. 6, 233, 116, 123

[56] References Cited

U.S. PATENT DOCUMENTS

| | | |
|---|---|---|
| 2,097,943 | 11/1937 | Zagorski . |
| 3,425,663 | 2/1969 | Priese . |
| 4,269,391 | 5/1981 | Saito et al. . |
| 4,328,974 | 5/1982 | White et al. . |
| 4,394,023 | 7/1983 | Hinojosa . |
| 4,500,092 | 2/1985 | Uomala et al. . |
| 4,601,475 | 7/1986 | Nicholson . |

FOREIGN PATENT DOCUMENTS

| | | |
|---|---|---|
| 0212101 | 4/1960 | Austria . |
| 0926435 | 5/1973 | Canada . |
| 0150780 | 8/1985 | European Pat. Off. . |
| 0612462 | 11/1960 | Italy . |
| 0687637 | 2/1953 | United Kingdom . |

Primary Examiner—John C. Fox
Attorney, Agent, or Firm—Frishauf, Holtz, Goodman & Woodward

[57] ABSTRACT

A piston type of shut-off valve with a sealing ring made of expanded graphite. A plurality of ring-shaped lamellae are each stamped from a foil of expanded graphite and then joined to form a sealing ring. A peripheral edge surface of the sealing ring, rather than its planar facing surface, comes into sealing contact with the piston thereby improving its service life. Service life of the sealing ring can be further improved by using a guard ring on a facing surface of the sealing ring as well as by using an installed density for the sealing ring of 1.5 to 2.2 g/cm$^3$.

14 Claims, 1 Drawing Sheet

SHUT-OFF VALVE

This application is a continuation-in-part application of Ser. No. 07/363,353 filed Jun. 6, 1989 now abandoned, which is a continuation of Ser. No. 165,407 filed Feb. 26, 1988, now abandoned, which is a continuation of Ser. No. 935,272 filed Nov. 26, 1986, now abandoned.

BACKGROUND OF THE INVENTION

The present invention relates to a shut-off valve and, in particular, to an improved seal design used for such valves of the piston type.

A valve housing is formed with a flow channel, or flow duct, which communicates an inlet with an outlet to permit the flow of a medium therethrough. A shut-off valve utilizes a closing-off element which is selectively movable in the housing to block the flow duct. In a piston type of shut-off valve, the closing-off element is an axially displaceable piston which is sealed in the housing by at least one sealing ring made of a compressible material.

The sealing ring with which the piston is operatively associated to block flow is subject to heavy wear. The sealing ring can, for example, be seated at the periphery of the flow channel, and the piston is inserted into the sealing ring to seal the flow channel. When the piston is drawn out of the sealing ring thereby opening up the flow channel, the sealing ring is exposed continuously to the flow of the medium. This inherently imposes a heavy load of wear on the sealing ring, given the possible flow speeds, and the load is still further increased in piston positions just slightly spaced from the sealing ring because then even higher flow speeds occur. Furthermore, a deflection in the flow channel typically takes place in the vicinity of the seal because the flow channel is not straight. Therefore, the flow encounters the inner cylindrical face of the sealing ring not only at a tangent, but also produces a radially directed component. Aside from this, the sealing ring is radially compressed each time the piston plunges inward, because only in this way is sealing possible. Accordingly, upon each closing movement, a squeezing effect takes place, followed by a sliding motion for the compressed part of the seal, associated with friction, and the sliding motion also takes place during the movement for opening the flow channel. The flow strains, squeezing strains and friction strains cannot long be withstood by conventional sealing rings, especially at elevated temperatures. The sealing ring can also be carried on the piston to engage the inner wall of the flow channel. Such an arrangement also subjects the sealing ring to much the same type of wear as discussed just above.

Expanded graphite, such as is available from Union Carbide Corporation under the brand name Grafoil, has the desirable characteristic of being essentially independent of temperature as far as its operating characteristics are concerned. However, it has the drawback of not being sufficiently resistant to erosion when exposed to a flowing medium. Prior art sealing rings that are made of expanded graphite are produced by compression molding of a winding that is coaxial with the piston axis and formed from a sheet of graphite of approximately the width of the axial dimension of the sealing ring. However, valves equipped with this type of sealing ring have a relatively short service life because the erosion forces generated by the flowing medium are applied to the planar surface area of the sheet of graphite which is not sufficiently resistant to erosion and, moreover, because known seals of this kind are not sufficiently dense. When seal erosion occurs to produce a leak, re-tightening by axially compressing the sealing ring is not a good solution because it causes uncontrollable deflection of the various layers of the winding, resulting in non-homogeneities that have a deleterious effect on the service life. Moreover, this winding type of sealing ring tends to wrinkle when it is axially compressed without an abutment at its inner and outer periphery. When such an abutment is present, as is the case with a valve, wrinkling cannot occur but the same forces that cause wrinkling in the absence of an abutment produce areas with a localized, variable, and highly elevated pressure in the presence of an abutment. Consequently, the force of actuation increases with each re-tightening, because the innermost layer of the winding abuts against the piston with a flat surface and, in particular, with variable, locally highly elevated pressure areas. When it is subjected to an oncoming flow, particles become easily detached from it.

SUMMARY OF THE INVENTION

It is a primary object of the present invention to provide an improved shut-off valve of the piston type.

A more specific object of the present invention is to provide an improved sealing ring for a piston-type shut-off valve.

Another object of the present invention is to provide a sealing ring for a piston-type shut-off valve made of expanded graphite and having improved service life characteristics.

These and other objects are attained by one aspect of the present invention which is directed to a shut-off valve, comprising a housing including means for defining a flow duct having a tubular portion of a given diameter in communication between an inlet portion and an outlet portion. An end of the tubular portion is provided with a sealable opening. A piston is sized to be received within the tubular portion at the sealable opening. A means is provided for selectively moving the piston along its axis in the tube portion back and forth from a sealing position at the sealable opening to block flow therethrough and an open flow position spaced from the sealing position. A sealing ring has its axis coincident with the piston axis and comprising a plurality of lamellae lying in a plane perpendicular to the piston axis and having a peripheral side edge surface lying in a direction parallel to the axis, said sealing ring being secured to one of the piston and the tubular portion and having its peripheral side edge surface in a slidably sealing engagement with the other of the piston and tubular portion. The lamellae of said seal are formed of expanded graphite having an installed density of 1.5 to 2.2 g/cm$^3$.

Another aspect of the present invention is directed to a sealing ring for a sliding piston type of shut-off valve having a flow channel with a tubular portion adapted to receive therein a piston movable along its axis for blocking flow of a medium through the flow channel when engaging a sealing ring fixed to the tubular portion. The sealing ring comprises a plurality of ring-shaped lamellae connected to each other and adapted to be in a plane perpendicular to the piston axis. The sealing ring includes an axis, with each of the lamellae having an inner peripheral side edge surface adapted to be substantially parallel to the sealing ring axis and sized to be sealingly engaged with the piston. Each of the lamellae being formed of expanded graphite adapted to have an installed density of 1.5 to 2.2 g/cm³.

Yet another aspect of the present invention involves the arrangement described just above, but with each of the lamellae having an outer peripheral side edge surface adapted to be substantially parallel to said sealing ring axis and sized to be sealingly coupled with said tubular portion.

An additional aspect of the present invention is directed to a seal for a valve having an inlet, an outlet and a flow channel communicating the inlet with the outlet, said flow channel having a sealing portion, a slidable member movable within the flow channel in a given direction, and a sealing device having a sealing surface lying in a direction parallel to the given direction. The sealing device is fixed to one of the sealing portion and the slidable member, and the sealing surface is adapted to sealingly engage the other of the sealing portion and the slidable member as it slides thereover in the given direction to block the flow channel. The seal comprises a plurality of lamellae having opposed face surfaces and a side edge, said lamellae being adapted to be in a plane perpendicular to the given direction. The sealing surface is formed by the respective side edges of the lamellae, each of the lamellae being made of expanded graphite adapted to have an installed density of 1.5 to 2.2 g/cm³.

DETAILED DESCRIPTION OF THE PREFERRED EMBODIMENTS

Figure 1:
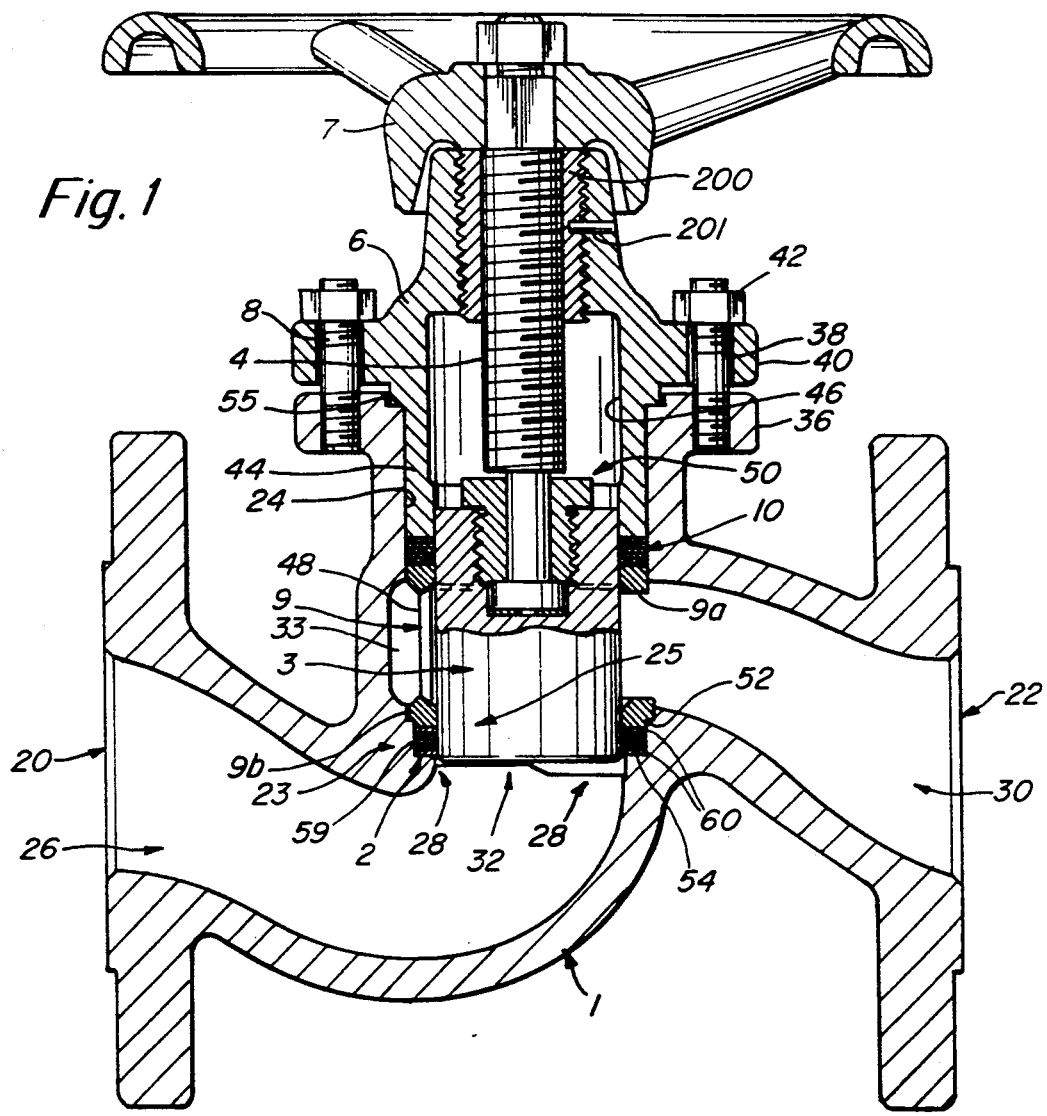
FIG. 1 is an axial sectional view taken through a piston type of shut-off valve.

FIG. 1 shows a shut-off valve with inlet opening 20 and outlet opening 22. Housing 1 of the valve includes a flow channel which communicates inlet 20 with outlet 22. The valve also defines a bore 24 which, among other things, accommodates slidable piston 3. The flow channel and bore 24 overlap so that the sliding motion of piston 3 within bore 24 can move it into position to affect passage of the medium through the flow channel.

More specifically, the flow channel has a portion 26 extending from inlet opening 20 to housing portion 23 having a tubular interior section 25 which defines piston sealing area 28. The flow channel also includes portion 30 which communicates opening 32 at an end of the tubular section 25 with outlet opening 22. Thus, flow of medium proceeds from inlet opening 20 through flow channel portion 26, into opening 32 and space 33, through flow channel portion 30, and exiting via outlet opening 22. When piston 3 is in the position shown by FIG. 1, flow of the medium through the valve is blocked because it cannot enter opening 32 from flow channel portion 26 due to piston 3 being positioned (and sealed as discussed below) within opening 32 at sealing area 28. However, when piston 3 is raised, as explained below, the medium can flow freely through the flow channel. Of course, the direction of flow can just as well be opposite to that described above with the inlet opening 2 and outlet opening 22 having their functions reversed.

A sealing ring 2 is positioned at piston sealing section 28, and it is seated in portion 23. The sealing ring 2 has an interior diameter which corresponds to the opening 32.

The valve is constructed with various parts that cooperate with housing 1 and piston 3. Specifically, valve head 6 is firmly attached to housing 1 by studs 8 which project from flange 36 of housing 1 and are accommodated in through holes 38 of flange 40 of the valve head 6. Nuts 42 on studs 8 are turned to press valve head 6 closer toward housing 1. Valve head 6 includes a tubular extension 44 which fits into a bore 24 of housing 1. Tubular extension 44 is formed with a bore 46. Bore 24 is also provided with sealing ring 10 separated from sealing ring 2 by a metallic spacer cage 9. Annular space 33 surrounds spacer cage 9. Sealing ring 10 rests on top support 9a of spacer cage 9, while base 9b of spacer cage 9 rests on sealing ring 2. A plurality of vertically extending members 48 equally distributed around the periphery of spacer 9 connect top support 9a to base 9b and provide it with rigidity as well as the requisite strength to withstand the forces applied to it by valve head 6, as explained below. Top support 9a of spacer cage 9 has an outer diameter equivalent to the inner diameter of bore 24. Base 9b and top support 9a of spacer cage 9 have an inner diameter substantially equal to the diameter of piston 3. However, the outer diameter of base 9b is stepped radially inward to oppose shoulder 52 formed in tubular section 25, as discussed below.

Piston 3 is conventionally coupled to spindle 4 which is actuated by hand wheel 7. As hand wheel 7 is turned, its outer threads interact with the inner threads of sleeve 200 which is immobilized in valve head 6 by pin 201. Sleeve 200 can be made of bronze to reduce friction between the sleeve and spindle while the hand wheel is rotated. That axial motion of spindle 4 is coupled to piston 3 via conventional coupling arrangement 50.

As explained above, tubular section 25 forms a shoulder 52 to oppose the correspondingly stepped base 9b of spacer cage 9. Sealing ring 2 rests on ring seating surface 54, while shoulder 52 is at a height measured from surface 54 that is at least equal to the height of sealing ring 2 in its delivered state, as explained below. Consequently, when spacer cage 9 is installed into bore 24, its base 9b will rest on the top of sealing ring 2, but will not touch shoulder 52. However, as nuts 42 are tightened onto studs 8, spacer cage 9 will be forced further into housing 1 until its narrowed outer diameter portion will extend into the narrowed portion at the sealing area 2B to thereby compress sealing ring 2 to its installed density. The valve can be designed so that the installed density is reached when the protruding part of spacer cage 9 will come to rest on shoulder 52 of housing 1 so that further tightening of nuts 42 will produce no further compression of sealing ring 2. It is also possible to use the approach of tightening until a predetermined torque is reached. Precisely the correct density can be attained for sealing ring 2 with either one of these approaches, but tighter tolerances are required for the former.

As will be readily apparent, the force applied by valve head 6 to sealing ring 10 will produce a different pressure than that produced on sealing ring 2 because of the different area size to which such force is applied. Because the area size of sealing ring 2 is smaller than that of sealing ring 10, a greater pressure is created in the former. Conversely, because sealing ring 10 has a larger area size by virtue of its width, it will be compressed less and can compensate for tolerances yet without causing excessive friction resistance at the piston because of its lesser density. In this manner, the intended higher density of sealing ring 2 can be attained s that it will be sufficient to protect it adequately against erosion, while at the same time a lower density is attained with the same compression force for sealing ring 10 to the extent needed.

Assembly of the valve begins by casting housing 1 into the shape shown in FIG. 1 and as described above. Sealing ring 2 is positioned in the sealing area 28 of bore 24. Spacer cage 9 is placed on top of that with the reduced outer diameter end being the one facing down. Sealing element lo is placed atop spacer cage 9, and valve head 6 is positioned so that its tubular extension 44 is inserted within bore 24 of housing 1 and comes to rest on sealing ring 10. Before inserting valve head 6 in this manner, hand wheel 7 has been turned so as to retract piston 3 into valve head 6. With all the parts being positioned as described up to this point, nuts 42 are screwed onto studs 8 so as to lower the tubular extension 44 into housing 1, but without yet tightening the assembly. After hand wheel 7 is turned to put piston 3 in sealing area 28, the nuts are tightened to bring sealing ring 2 into engagement with piston 3. The resulting force produced by the nuts is applied to sealing element 10, spacer cage 9, and finally delivered to sealing ring 2. Sealing ring 2 is compressed until spacer cage 9 can no longer move because of its being brought to rest on shoulder 52. At this point, sealing ring 2 is compressed to its final, installed density. Sealing ring 10 is compressed to a lower density than the density of sealing ring 2 and, at that point, no more pressure may need to be applied. However, nuts 42 may also continue to be turned until a predetermined torque is reached or shoulder 55 of housing 1 is engaged by valve head 6, whichever approach is thought to be best for a particular application, in order to reach the desired density of sealing ring 10. The latter approach may also be used as an alternative for attaining the desired density of sealing ring 2.

In operation, hand wheel 7 is turned to move the piston 3 which will slide along the inner radial surface of sealing ring 10. This seal prevents leaks to the outside of the valve. A downward motion from the uppermost position of piston 3 (as viewed in FIG. 1) begins to constrict the flow channel. Continued turning of hand wheel 7 forces piston 3 into sealing ring 2. In this position, piston 3 and sealing ring 2 are sealingly engaged to completely block the flow channel (as shown in FIG. 1).

A particularly significant aspect of the present invention concerns the design of sealing ring 2. It is formed with a plurality of ring-shaped lamellae 59 having facing surface areas 80 (see FIG. 3) and peripheral side edges 82. These will be referred to below as faces and edges, respectively, for the sake of brevity. The faces are perpendicular to the piston axis. These lamellae are made of expanded graphite. Such expanded graphite is, for example, the above-mentioned Grafoil. The ring lamellae for sealing ring 2 are formed by stamping. Once the individual lamellae are stamped into ring form, they are attached to each other at their faces to form sealing ring 2, preferably by an adhesive. The thusly fabricated sealing ring 2 can have a density of 1.3 to 1.95 g/cm$^3$. This delivered density is changed during the valve assembly procedure, as explained above, to a value within the range of 1.5 to 2.2 g/cm$^3$, and preferably 1.6 to 1.95 g/cm$^3$.

Sealing ring 2 can be manufactured so that its inner diameter is larger than the diameter of piston 3. As tightening of nuts 42 and thus compressing of sealing ring 2 takes place, the latter closes tightly around piston 3 to form a sealing ring inner diameter equal, in the installed state, to the outer diameter of the piston. Due to its very small elasticity, the sealing ring 2 may slightly protrude into the flow channel when it is not engaged with piston 3. It is necessary to size the sealing surface of sealing ring 2 to assure a good sealing fit with respect to the piston 3. The inner diameter of sealing ring 2 should be 0.0 to 0.2 mm smaller than piston 3. If the inner diameter of sealing ring 2 were smaller, and with the density that assures sealing ring 2 its desired properties, there would be the risk that damage would be caused to sealing ring 2 when piston 3 moves into it.

Sealing ring 2, manufactured and assembled in a manner disclosed above, presents an edge toward piston 3 which is highly resistant to wear and deformation. Rather than having a face come into contact with piston 3 and the flowing medium, sealing ring 2 of the present invention presents only the edge of each lamella thereto. The edge is more resistant to erosion than the face. This is due to the following. The expanded graphite particles have a potato-like form which, when flattened assumes a shape with an irregular periphery. As each of the flattened particles nests with its adjacent neighbors, the only areas thereof that is exposed to the environment are one of its flattened faces (for those particles on an exposed face of the sealing ring) and the side edge at its irregular periphery (for those particles at the edge of the sealing ring 2). Clearly, the exposed flattened face has a much larger surface area than the edge. Consequently, smaller erosion forces are experienced by each particle in accordance with the present invention than those to which prior art sealing rings are subjected. In this regard, exposing only an edge of a particle, rather than its flattened face, to the flowing medium and to the piston is crucial; and this is accomplished by exposing only an edge of the sealing ring to the erosion and frictional forces. Moreover, the density of the sealing ring has been raised to a point sufficient to withstand a great deal of friction applied to it by the sliding motion therethrough of piston 3 and the flow past it of the medium. Consequently, a construction of sealing ring 2 in accordance with the present invention results in a significant increase in the service life of the valve.

A further improvement in the erosion-resistant characteristics of sealing ring 2 can be attained by adding to it a guard ring 60. A guard ring 60 is positioned on each of the faces of sealing ring 2. The inner diameter of guard ring 60 is larger than that of sealing ring 2 by 0 to 1 mm so as to be clearly spaced from the opposing surface of piston 3. After all, the sealingly engaged surfaces must be the piston 3 and sealing ring 2, not any of the guard ring surfaces. Guard rings 60 are made of an erosion resistant material such as steel or ceramic. Upper guard ring 60 is particularly advantageous because the upper portion of sealing ring 2 is subject to the greatest wear when high speeds of the flowing medium occur as piston 3 is positioned just above sealing ring 2 to form a narrow gap therebetween. The rigidity of guard ring 60 bears against and stiffens the adjacent portion of sealing ring 2 with the result that erosion under such particularly adverse conditions is at least minimized. In addition, a density for sealing ring 2 in the lower part of the above-disclosed range of densities can be selected when a guard ring is utilized. Such lower density provides higher compressibility which, in turn, reduces friction and increases ease of operation. Lower guard ring 60 is not essential, but its use is advantageous because it assures that sealing ring 2 cannot be installed incorrectly.

Figure 3:
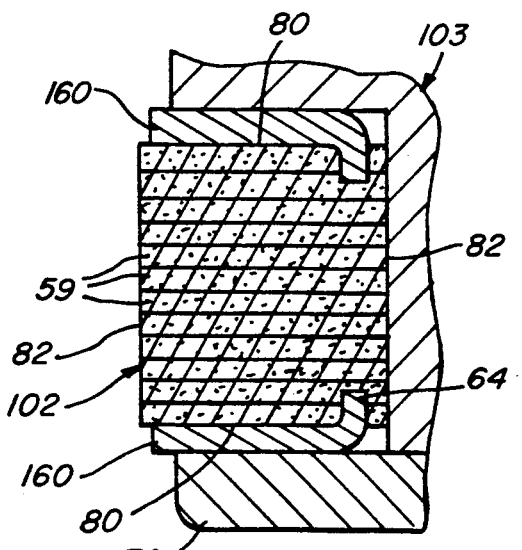
FIG. 3 is an expanded, fragmentary cross-sectional view of a portion of FIG. 2 showing a sealing ring with attached guard rings.

Guard rings 60 are preferably fixed to sealing element 2 with pin-like connecting elements 64 (See FIG. 3). To secure guard rings 60 against detachment, the pin-like connecting elements may also have barbs (not shown) that permit pins 64 to puncture the sealing ring 2, but then prevent their removal. These pins are formed by stamping the guard rings to cut and bent portions thereof to extend perpendicularly to the body of the guard rings. Barbs can be formed by also cutting the bent portion into a barb-like shape, or the pin 64 rather than being bent into an L-shape can be bent through a greater angle to form a V-shape. Such devices are well known and, therefore, no further details are deemed necessary.

Figure 2:
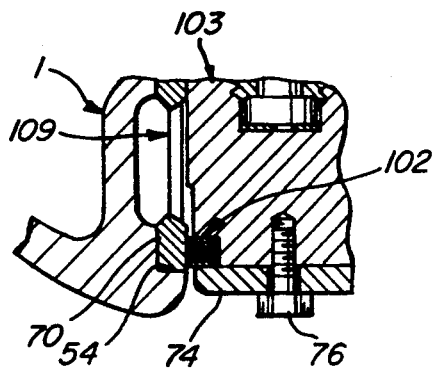
FIG. 2 is an expanded, fragmentary cross-sectional view of another embodiment showing the sealing ring secured to the piston.

FIG. 2 shows a second embodiment which differs from that depicted in FIG. 1 by virtue of having sealing ring 2 fixed to piston 3 rather than positioning it in sealing area 28 of bore 24. The bottom part 70 of spacer cage 109, is cylindrical and extends down to surface 54 of housing 1 where bore 24 terminates. Surface 54 of housing 1 and the surface of part 70 which opposes it have a seal (not shown) compressed therebetween to prevent outward leakage of the medium at that point in the valve. Sealing ring 102 is seated in a suitably sized annular recess of piston 103. The outer diameter of sealing ring 102 is slightly bigger than that of the adjacent portion of piston 103 where sealing ring 102 is seated. Thus, the outer radial surface of sealing ring 102 bears against the inner diameter of lower portion 70 of spacer cage 109. Sealing ring 103 is maintained in place by a plate 74 secured to piston 103 with screw 76.

As was the case with the first embodiment, the FIG. 3 embodiment can also advantageously be provided with guard rings 160. These are secured to sealing ring 102 with pins 64 and barbs (not shown) as discussed above. In the second embodiment, the lower portion of sealing ring 102 is most exposed to erosion. Therefore, use of the lower guard ring 160 is more important, whereas upper guard ring 160 is provided for ease of installation, as explained above.

Sealing ring 2 has been disclosed above as being compressed into its final density while the valve is assembled. For sealing ring 102, some compression is possible by tightening screw 76. However, the initial density is nearly the final density. For this embodiment, the outer diameter of sealing ring 102 could be 0.0 to 0.2 mm larger than the inner diameter of spacer cage portion 70.

Both embodiments of the piston type shut-off valve disclosed above have good sealing characteristics with a relatively long service life without the necessity of retightening of the sealing rings. In fact, no such retightening devices are provided. The actuation forces are relatively low, and the danger of seal erosion is minimized because the peripheral side edge rather than the surface area on the face of the sealing ring engages the piston 3.

Although preferred embodiments of the present invention have been disclosed above, various modifications thereto are readily apparent to one with ordinary skill in the art. For example, although sealing rings 2 and 102 can be manufactured in an original, delivered density which is later compressed during installation to the final density, as disclosed above, sealing rings 2 and 102 can also be manufactured with a final density that requires no further compression during assembly. Also, bottom guard ring 60 of the first embodiment and top guard ring 160 of the second embodiment can be dispensed with since it is the other guard ring in each respective embodiment that provides primary protection against erosion, particularly for a small gap which is formed when the piston is slightly raised. Furthermore, instead of using a separate ring as a guard ring, the spacer cage 9 can be utilized to perform this function in the first embodiment by sizing its inner diameter to be larger than the inner diameter of sealing ring 2 by 0.0 to 1 mm. Specifically, the bottom-most surface of spacer cage 9 which bears on sealing ring 2 can be fabricated to the requisite tolerance so that it fits properly between the wall of bore 24 and piston 3. However, this is difficult to do from a manufacturing standpoint. If the necessary tolerances are not met, spacer cage 9 can become stuck in housing 1. These and other such modifications are all intended to be included within the scope of the present invention as defined by the following claims.

We claim:

1. A shut-off valve, comprising:
   a housing including means for defining a flow duct having a tubular portion of a given diameter in communication between an inlet portion and an outlet portion, and an end of said tubular portion having a sealable opening;
   a piston sized to be received within said tubular portion at said sealable opening;
   means for selectively moving said piston along its axis in said tubular portion back and forth from a sealing position at the sealable opening to block flow therethrough for closing the flow duct and an open flow position spaced from said sealing position for opening the flow duct;
   a sealing ring having its axis coincident with the piston axis and comprising a plurality of lamellae formed of expanded graphite having an installed density of 1.5 to 2.2 g/cm$^3$ and lying in a plane perpendicular to the piston axis, with an inner radial surface of said sealing ring lying in a direction parallel to said axis, said sealing ring being secured to the tubular portion at the periphery of said sealable opening and having its inner radial surface in a slidably sealing engagement with said piston; and
   a guard ring on at least a facing surface of said sealing ring which faces the piston when the flow duct is open, wherein said guard ring has an inner diameter 0.0 to 1 mm larger than the inner diameter of said sealing ring.

2. The shut-off valve of claim 1, wherein said sealing ring has an inner diameter smaller than the diameter of said piston by 0.0 to 0.2 mm in a non-installed state.

3. The shut-off valve of claim 2, wherein said sealing ring is manufactured with a density of 1.3 to 1.95 g/cm$^3$, and further comprising means to compress the sealing ring to its said installed density.

4. The shut-off valve of claim 1, wherein said guard ring is made of an erosion resistant material.

5. The shut-off valve of claim 1, wherein said guard ring is made of an erosion resistant material.

6. The shut-off valve of claim 1, wherein said sealing ring is manufactured with a density of 1.3 to 1.95 g/cm$^3$, and further comprising means to compress the sealing ring to its said installed density.

7. The shut-off valve of claim 1, wherein the installed density is 1.6 to 1.95 g/cm$^3$.

8. A sealing ring for a sliding piston type of shut-off valve having a flow channel with a tubular portion adapted to receive therein a piston movable along its axis for blocking flow of a medium through said flow channel when engaging a sealing ring having an axis and fixed to said tubular portion, said sealing ring comprising:

a plurality of ring-shaped lamellae connected to each other and adapted to be in a plane perpendicular to said piston axis, with each of said lamellae having an inner peripheral side edge surface adapted to be substantially parallel to said sealing ring axis and sized to be sealingly engaged with said piston, each of said lamellae being formed of expanded graphite adapted to have an installed density of 1.5 to 2..2 g/cm$^3$; and a guard ring on at least one exposed, outwardly directed face of said plurality of lamellae connected to each other.

9. The sealing ring of claim 8, wherein the installed density is 1..6 to 1.95 g/cm$^3$.

10. The sealing ring of claim 8, wherein said sealing ring is manufactured with a density of 1.3 to 1.95 g/cm$^3$.

11. The sealing ring of claim 8, wherein each of said plurality of ring-shaped lamellae is stamped from a foil of expanded graphite.

12. The sealing ring of claim 8, wherein each of said plurality of ring-shaped lamellae is attached to its adjoining lamellae.

13. The sealing ring of claim 8, wherein said guard ring is made of an erosion resistant material.

14. The sealing ring of claim 8, wherein said guard ring has an inner diameter 0 to 1 mm larger than the inner diameter of said plurality of ring-shaped lamellae.

* * * * *